United States Patent [19]

Isikawa et al.

[11] 4,031,347

[45] June 21, 1977

[54] PROTECTIVE GAS CAP FOR ELECTRIC POWER APPARATUSES

[75] Inventors: Tosio Isikawa; Jun Ozawa; Takehiro Kikuchi, all of Hitachi, Japan

[73] Assignee: Hitachi, Ltd., Japan

[22] Filed: Oct. 29, 1975

[21] Appl. No.: 626,992

[30] Foreign Application Priority Data

Nov. 11, 1974 Japan ............................ 49-128999

[52] U.S. Cl. ............................ 200/148 B; 361/112; 361/131; 361/120

[51] Int. Cl.[2] ..................... H02H 33/22; H02H 1/00

[58] Field of Search .................... 200/148 B, 148 H; 317/71, 69, 62, 51, 61

[56] References Cited

UNITED STATES PATENTS

| | | | |
|---|---|---|---|
| 1,104,038 | 7/1914 | Damschen | 317/69 |
| 1,479,692 | 1/1924 | Bennett | 200/148 H |
| 2,237,426 | 4/1941 | Grassnick et al. | 317/62 |
| 2,990,492 | 6/1961 | Wellinger et al. | 317/62 |
| 3,777,218 | 12/1973 | Kessler | 200/148 B |
| 3,891,897 | 6/1975 | Jakszt | 317/71 |

*Primary Examiner*—Robert S. Macon
*Attorney, Agent, or Firm*—Craig & Antonelli

[57] ABSTRACT

Spark gap apparatuses are provided at the receiving end or the sending end of an electric power substation, in order to protect electric apparatus in the electric power substation against the surge voltage incoming from the power transmission lines. In the case where the gap of such a spark gas apparatus is placed in electronegative gas, for example $SF_6$ gas, the spark voltage vs. spark time characteristic varies depending on the polarity of the surge voltage and thus the protecting performance of the spark gap apparatus is poor. The improvement in the protecting performance of the spark gap apparatus is provided by substantially equilizing the maximum electric field developed between the end surfaces of a pair of electrodes which are oppositely disposed to each other to form a spark gap therebetween.

9 Claims, 6 Drawing Figures

PROTECTIVE GAS CAP FOR ELECTRIC POWER APPARATUSES

FIELD OF THE INVENTION

The present invention relates to an improvement of a protective gas gap for protecting against surge voltages, electric apparatus, particularly electric power apparatus insulated with electronegative gas.

BACKGROUND OF THE INVENTION

It has been well known to provide air gaps at the incoming end of an electric power substation which is connected to the transmission lines in order to protect electric apparatus installed at the substation against a lightning voltage. Generally, such an air gap is constructed in a manner that rod-like electrodes are oppositely disposed to each other or a rod-like electrode is disposed opposite to a ringshaped electrode.

Figure 1:
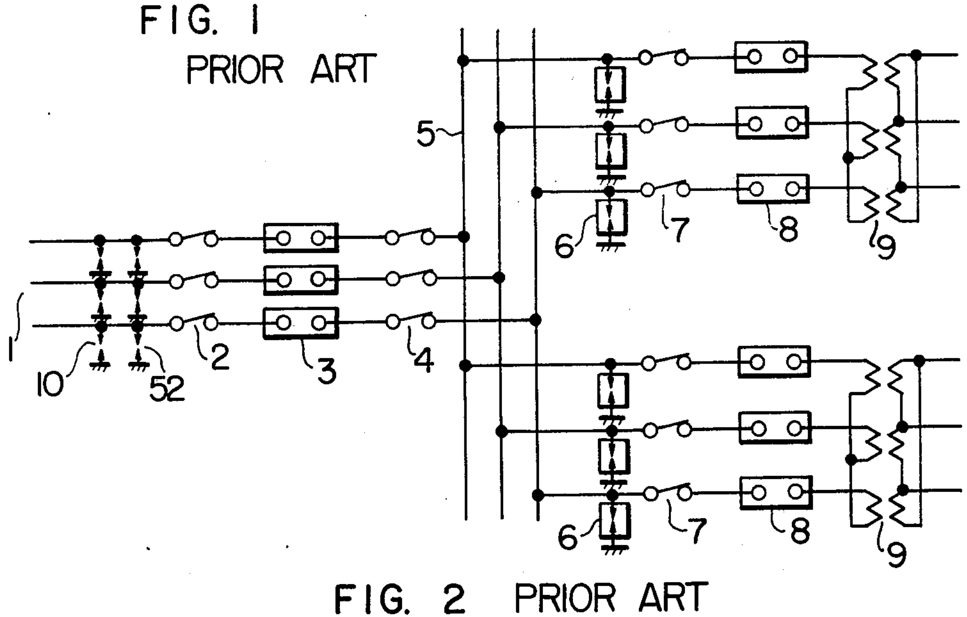
FIG. 1 is a schematic circuit diagram illustrating an example of conventional connection of an electric power substation.

FIG. 1 shows an example of the connections between transmission lines and an electric power substation at its incoming end.

In the figure, the transmission lines 1 are connected to busbars 5 through disconnecting switches 2, circuit breakers 3, and disconnecting switches 4 in turn and the busbars 5 are connected to a main transformer 9 through disconnecting switches 7 and circuit breakers 8 in turn. Further, lightning arresters 6 are connected between the busbars 5 and the disconnecting switches 7 and air gaps 10 are provided at the incoming end of the substation connected to the transmission lines 1.

When the circuit breaker 3 is of a gas circuit breaker which is filled with an electronegative gas, such as $SF_6$ gas, for the purpose of insulation and arc-suppression, the insulation arrangement is so made therein as to develop a quasi-uniform electric field.

Such a quasi-uniform electric field insulation arrangement is made also in a gas insulated switch-gear in which the circuit breakers, the disconnecting switches, busbars, etc. are insulated by means such an $SF_6$ gas as mentioned above.

Figure 2:
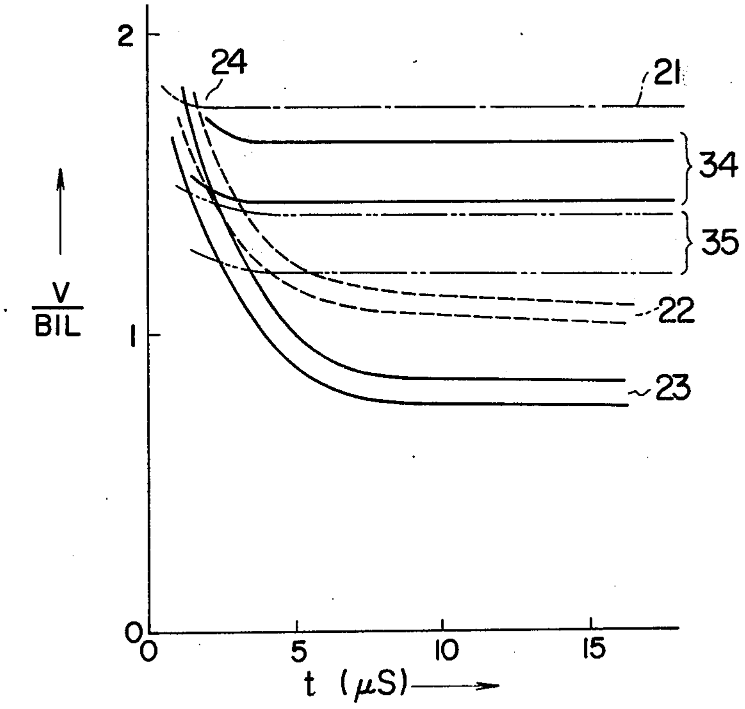
FIG. 2 illustrates in graph form the spark voltage vs. spark time characteristic of a conventional gas insulated electric apparatus and a conventional protection spark gap.

The spark voltage vs. The spark time characteristic (referred to as V-t characteristic) of these gas insulated electrical apparatuses is represented by a curve 21 of FIG. 2 in which the ratio of the spark voltage (V) to the basic impulse level (BIL), i.e. V/BIL, is plotted as ordinate and the spark time ($\mu$s) is plotted as abscissa. As seen from the figure, the V-t characteristic curve 21 has a long plateau extending to about 1 to 2 $\mu$s with respect to the decreasing direction of the abscissa.

In the case of the air gap 10, its V-t characteristic curves steeply rise in the steep wave region beginning at about 6 $\mu$s with respect to the decreasing direction of the abscissa and a coordination point 24 appears, as seen from the curves 22 and 23; the former being plotted for a negative surge voltage while the latter for a positive one.

Thus, the gas insulated electrical appliances are inferior to the conventional air insulated apparatuses in the coordination of insulation with the air-gap. Accordingly, the gas insulated electrical apparatus have insulation problems beyond the insulation ability of the air gap.

For this reason, a gas gap in which a pair of electrodes oppositely disposed are placed in an electronegative gas such as $SF_6$ gas has been proposed as a protection gap having a flat V-*t* characteristic, in place of the air gap.

Figure 3:
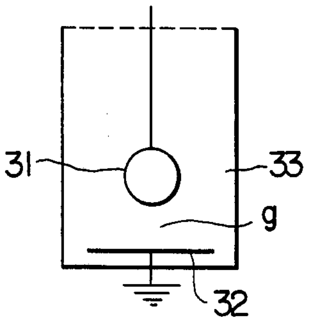
FIG. 3 schematically shows the construction of a conventional gas gap.

FIG. 3 illustrates an example of such a gas gap in which a high tension side ball like, electrode 31 and a ground side plate like electrode 32 are disposed oppositely to each other with a predetermined gap *g* therebetween in a hermetically sealed container 33 filled with $SF_6$ gas. The V-*t* characteristics of such a gas gap are shown in FIG. 2, in which reference numeral 34 designates the V-*t* characteristic in the case of a positive surge voltage and 35 in the case of a negative surge voltage. As seen from the V-*t* characteristics in the figure, the gas gap exhibits more extended plateau portion of the characteristic curve than the air gap. However, the protection performance of the gas gap is not always sufficient because the characteristic of the gas gap depends largely on the difference of polarity of the surge voltage.

SUMMARY OF THE INVENTION

Accordingly, an object of the present invention is to provide a protective gas gap for electric power apparatus of which the V-t characteristic is invariable depending on the polarity of incoming surge voltage.

In accordance with the present invention, the objective is achieved by a protective gas gap having a pair of electrodes which are oppositely placed in an electronegative gas and which are constructed such that each of the respective confronting portions of the electrodes has a substantially semispheric smooth surface and the diameter of the semispheric end portion of the ground side electrode is smaller than that of the semispheric end portion of the high tension side electrode and that a plate-like back electrode having a diameter substantially equal to the inner diameter of a cylindrical vessel accommodating those electrodes is closely disposed at the back of the ground side electrode, so that the maximum electric fields appearing around both the electrode ends facing to each other are substantially equalized. Here, the term "substantially semispheric smooth surface" is so defined as to represent all the smooth curved surfaces including a semi-regular-spheric smooth surface, a semi-ellipsoidal smooth surface, etc. In this case, as the concentration of the electric field (Maximum electric field/average electric field = $\xi$ ) between the electrodes facing each other increases, the flashover voltage in the steep wave region (0.0 $\mu$s) becomes higher, with the result that it is impossible to obtain a flat V-t characteristic curve. For this, when the present invention is practiced, it is desirable to select the diameter of the semipheric end portion of the high tension side electrode and the gap distance between the confronting electrodes in such a manner as will be described later in order to provide, electric fields having the concentration of $\zeta$ = 1.0 to 1.5. Further, the high tension side electrode is fixed while the ground side electrode is shiftable relative to the high tension side electrode in order to obtain an optimum distance between both the confronting electrodes. In this case, a mechanism for shifting the ground side electrode is provided outside the cylindrical vessel accommodating both the electrodes so as to enable adjustment of the electrode gap from the outside.

DESCRIPTION OF THE PREFERRED EMBODIMENT

Preferred embodiments of the present invention will be described in detail in accordance with accompanying drawings.

Figure 4:
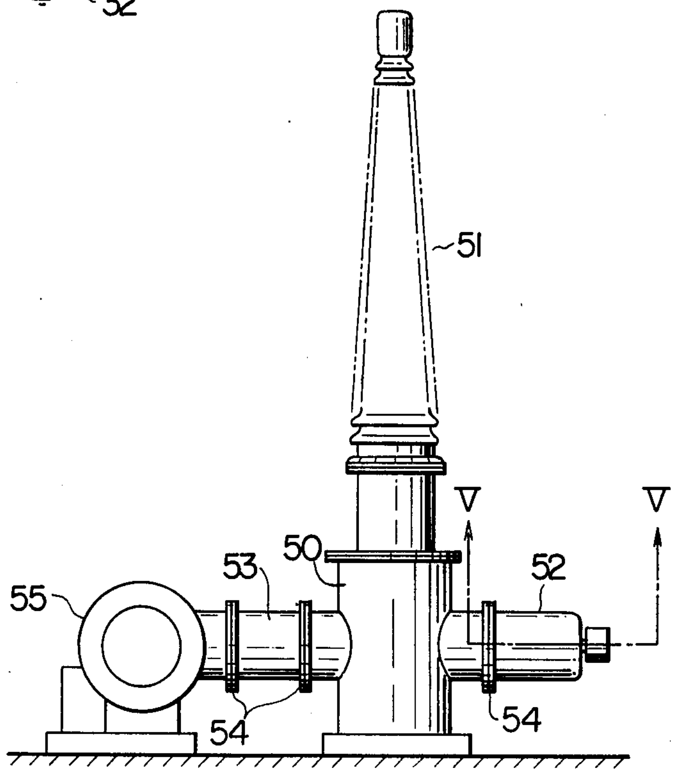
FIG. 4 is a side view of a gas insulated switch-gear to which a gas gap according to the present invention is applied.

Referring now to FIG. 4, there is shown an embodiment of a gas insulated switch-gear to which a protective gas gap according to the present invention is applied. In the figure, a bushing vessel 50 with a bushing 51 upstanding therefrom is coupled at its one side with a gas insulated breaker 55 through a gas insulated disconnecting switch 53 while at the other side is coupled with a gas gap 52. The bushing vessel 50, the disconnecting switch 53, the gas insulated circuit breaker 55, and the protective gas gap 52, are separated with respect to the gas by insulating spacers 54 each being fitted between adjacent connection flanges.

Figure 5:
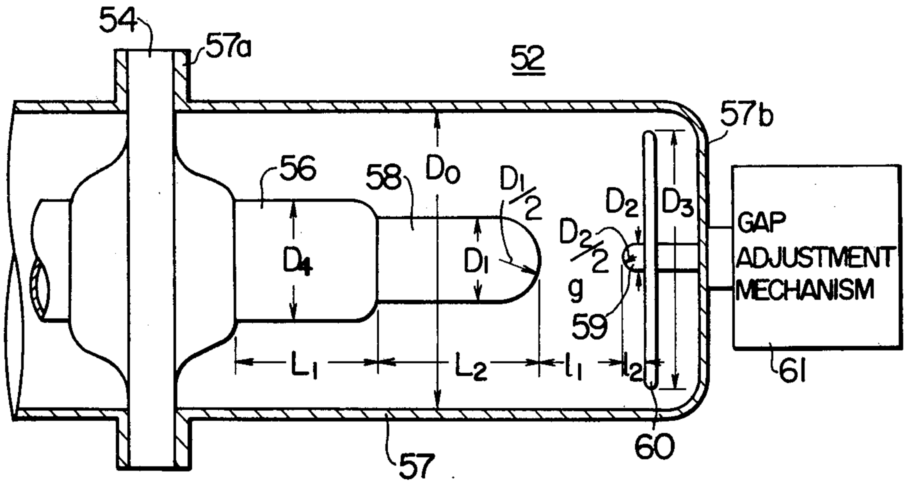
FIG. 5 is a longitudinal sectional view of an embodiment of a gas gap according to the present invention.

FIG. 5 shows an example of the protective gas gap 52 according to this invention. In the figure, an electrically grounded cylindrical vessel 57 is hermetically mounted on one side of an insulating spacer 54 by means of a flange 57*a* formed on the periphery of the opening of the vessel 57. The insulating spacer 54 supports a high tension conductor 56 hermetically passing therethrough. In this vessel 57, a high tension side electrode 58 is desposed opposite to a grounded electrode 59 with a gap *g* therebetween. These electrodes are aligned with the axis of the vessel 57. Each of the confronting end portions of the electrodes 58 and 59 are formed in a semispheric shape. The vessel 57 is filled with an electronegative gas similar to the insulating gas for filling the gas insulated apparatuses. The high tension side electrode 58 is mounted on the end of the high tension conductor 56 projecting from the insulating spacer 54 into the vessel 57. The length $L_1$ of the projection of the high tension conductor 56 projecting from the insulating spacer 54 is selected to be substantially equal to the diameter $D_4$ of the high tension conductor 56 in order to avoid the disturbance of the creepage electric field of the insulating spacer 54. The grounded electrode 59 having a diameter smaller than that of the high tension side electrode is supported by the end plate 57*b* of the vessel 57 which is opposite to the insulating spacer 54 and the flange 57*a*. The semispheric end portion of the grounded electrode 59 is integrally provided with a disc-like electrode 60 just to the rest thereof.

The grounded electrode 59 is shiftable by means of a gap adjustment mechanism 61 mounted on the end plate 57*b* of the vessel 57 so that the gap *g* between the high tension side electrode and the grounded electrode may be adjusted. The coupling member between the grounded electrode 59 and the gap adjustment mechanism 61 is hermetically passed through the end plate 57*b* by using a proper sealing member such as an O-ring. The diameter $D_3$ of the back electrode 60 is selected to be approximate to the inner diameter $D_o$ of the vessel 57, so that concentration of the electric field on the end portion of the back electrode is prevented.

The experiments conducted by the inventors of the present patent application showed the following good results. Assume that the diameter of the high tension side electrode 58 is designated by $D_1$, the radius of curvature of the semispheric end of the high tension side electrode by $D_1/2$, the diametero of the grounded electrode 59 by $D_2$, the radius of curvature of the semispheric end of the grounded electrode by $D_2/2$, the gap length between the high tension side electrode and the grounded electrode by $l_1$, the length of projection of the grounded electrode 59 projecting from the back electrode 60 toward the high tension side electrode 58 by $l_2$, and the length of the high tension side electrode 58 by $L_2$. Under this assumption, those demension were related as follows:

$$D_1 \approx D_0/4,\ D_2 \approx D_1/4,\ l_2 \approx l_1/4,\ L_2 \geqq 4l_1,\ l_1 \approx D_1/2$$

As a result of such relations, the respective electric fields appearing around the top end surfaces of the high tension side electrode 58 and the grounded electrode 59 could be controlled to be substantially equal and the concentration of electrical field $\xi$ could be restricted below 1.5. The V-*t* characteristics of the thus constructed protective gas gap exhibited a plateau region extending to a steep wave region at 1.0 ($\mu$s) and was substantially independent of the polarity of surge voltage.

Figure 6:
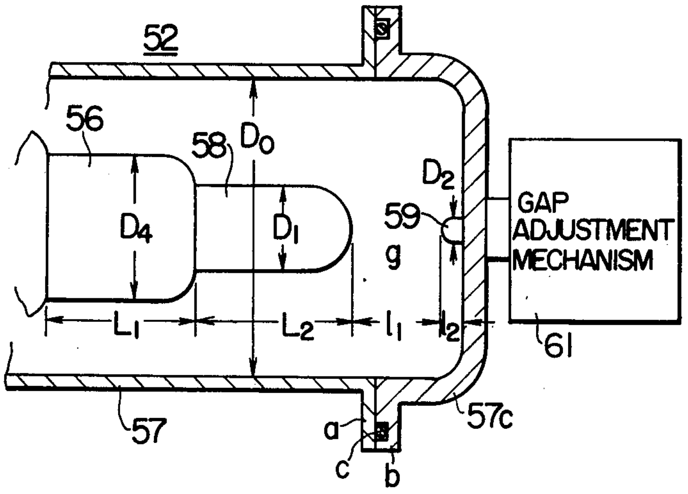
FIG. 6 is a longitudinal sectional view of another embodiment of a gas gap according to the present invention.

FIG. 6 shows another embodiment of the protective gas gap according to the present invention in which the end plate of the vessel 57 is used to form the back electrode provided on the grounded electrode 59. In this case, when spark takes place in the gap, arcs possibly occur between the high tension side electrode and the end plate 57*c* to damage the wall of the container to possibly break the hermeticity of the vessel. Therefore, it is desirable that the end plate 57*c* of the vessel 57 is made thicker, or is made of arc resistive material, or is lined with arc resistive metal. In this example, the protective gas gap vessel 57 is comprised of the body portion 57*d* with a flange *a* and the end plate 57*c* with a flang *b*. The body portion 57*d* and the end plate 57*c* are airtightly coupled with each other by coupling the respective flanges *a* and *b* with a packing therebetween and welding entirely the perphery of the coupled flanges.

As described above, the protective gas gap according to the present invention is constructed such that a pair of electrodes each of whose oppositely disposed end portions is formed to have a substantially semispheric smooth surface are substantially coaxially disposed in a cylindrical vessel which is electrically grounded and filled with an electronegative gas; and that the diameter of the semispheric end portion of the grounded electrode is smaller than that of the semispheric end portion of the high tension side electride; and that a plate-like back electrode having a diameter which is substantially equal to the inner diameter of the cylindrical vessel is closely disposed at the back of the grounded electrode, whereby the maximum electrical fields appearing around both the electrode ends are approximately equal. With such construction, the V-*t* characteristic of the protective gas gap placed in the electronegative gas may be obtained improved such that the flat portion of the V-*t* characteristic curve extensively extends to the steep wave region irrespective of the polarity of incoming surge voltage.

We claim:

1. A protective gas gap for electric power apparatus having a cylindrical vessel electrically grounded and filled with an electronegative gas and a pair of electrodes oppositely disposed to each other with a predetermined gap therebetween in said cylindrical vessel substantially in alignment with the center-line of said vessel, one of said pair of electrodes being connected with a high tension charged conductor which is in turn connected to a transmission line while the other being electrically grounded; in which each of the confronting portions of said pair of electrodes is formed to have a substantially semispheric smooth surface; in which the maximum diameter of the end portion of said grounded electrode is smaller than that of the end portion of said high tension side electrode; and in which a plate-like back electrode having a diameter which is substantially equal to the inner diameter of said cylindrical vessel is closely disposed at the back of said grounded electrode.

2. A protective gas gap according to claim 1, in which said gas gap comprises a gap adjustment mechanism for integrally shifting said grounded electrode and said back electrode to thereby adjust said gap between said high tension side electrode and said grounded electrode.

3. A protective gas gap according to claim 1, in which said gas gap comprises a disk like insulating spacer hermetically mounted at one end of said cylindrical vessel, said high tension charged conductor passing through said spacer hermetically to project into said cylindrical vessel, said high tension side electrode being mounted at the end of the projecting portion of said high tension charged conductor.

4. A protective gas gap for electric power apparatuses having a cylindrical vessel electrically grounded and filled with an electronegative gas and a pair of electrodes oppositely disposed to each other with a predetermined gap therebetween in said cylindrical vessel substantially in alignment with the center-line of said vessel, one of said pair of electrodes being connected with a high tension charged conductor which is in turn connected to a transmission line while the other being electrically grounded; in which each of the confronting portions of said pair of electrodes is formed to have a substantially semispheric smooth surface; in which the maximum diameter of the end portion of said grounded electrode is smaller than that of the end portion of said high voltage electrode; and in which said grounded electrode is mounted to a metal plate portion formed at one end of said cylindrical vessel, said grounded electrode being mounted on and projecting from said metal plate portion.

5. A protective gas gap according to claim 4, in which said metal plate portion formed at said one end of said cylindrical vessel is separated from said cylindrical vessel and said gas gap further comprises means for normally hermetically coupling said metal plate portion with said cylindrical vessel.

6. A protective gas gap according to claim 4, in which said metal plate portion formed at said one end of said cylindrical vessel is made of arc resistive metal.

7. A protective gas gap according to claim 4, in which said metal plate portion formed at said one end of said cylindrical vessel has a thickness thicker than that of the wall of said cylindrical vessel.

8. A protective gas gap according to claim 4, in which said grounded electrode is provided with a gap adjustment mechanism for adjusting said gap between said grounded electrode and said high tension side electrode.

9. A protective gas gap for electric power apparatuses including a circuit breaker housed in an airtighted vessel filled with an electronegative gas, a disconnecting switch housed in an airtighted vessel filled with an electronegative gas and electrically connected in series with said circuit breaker, a terminal busing for connecting said disconnecting switch to a transmission line, a high tension side electrode maintained at the same potential as that of the connecting portion between said bushing and said disconnecting switch, a grounded electrode disposed opposite to said high tension side electrode with a given gap therebetween, and a cylindrical metal vessel filled with an electronegative gas and accommodating said high tension side electrode and said grounded electrode; in which each of the confronting end faces of both said electrodes is formed to have a substantially semispheric smooth surface; in which the maximum diameter of the end portion of the said grounded electrode is about a quarter of that of the end portion of said high tension side electrode; and in which a plate-like back electrode having a diameter which is substantially equal to the inner diameter of said metal vessel is closely disposed at the back of said grounded electrode.

* * * * *